(12) United States Patent
Hsu et al.

(10) Patent No.: US 11,393,141 B1
(45) Date of Patent: Jul. 19, 2022

(54) GRAPHICAL DATA DISPLAY

(71) Applicant: Amazon Technologies, Inc., Seattle, WA (US)

(72) Inventors: Benjamin Hsu, Alexandria, VA (US); David Mordechai Sloan, Silver Spring, MD (US)

(73) Assignee: Amazon Technologies, Inc., Seattle, WA (US)

( * ) Notice: Subject to any disclaimer, the term of this patent is extended or adjusted under 35 U.S.C. 154(b) by 108 days.

(21) Appl. No.: 17/036,422

(22) Filed: Sep. 29, 2020

(51) Int. Cl.
| | |
|---|---|
| *G06T 11/20* | (2006.01) |
| *G06F 16/93* | (2019.01) |
| *G06F 16/28* | (2019.01) |
| *G06F 16/901* | (2019.01) |
| *G06F 16/26* | (2019.01) |
| *G06F 40/284* | (2020.01) |
| *G06F 40/295* | (2020.01) |
| *G06T 11/00* | (2006.01) |
| *G06N 3/08* | (2006.01) |
| *G06F 40/205* | (2020.01) |
| *G06V 30/40* | (2022.01) |
| *G06V 30/10* | (2022.01) |

(52) U.S. Cl.
CPC .......... *G06T 11/206* (2013.01); *G06F 16/26* (2019.01); *G06F 16/288* (2019.01); *G06F 16/9024* (2019.01); *G06F 16/93* (2019.01); *G06F 40/205* (2020.01); *G06F 40/284* (2020.01); *G06F 40/295* (2020.01); *G06N 3/08* (2013.01); *G06T 11/001* (2013.01); *G06V 30/40* (2022.01); *G06T 2200/24* (2013.01); *G06V 30/10* (2022.01)

(58) Field of Classification Search
CPC . G06T 11/206; G06T 11/001; G06T 2200/24; G06F 16/26; G06F 16/288; G06F 16/9024; G06F 16/93; G06F 40/205; G06F 40/284; G06F 40/295; G06N 3/08; G06V 30/40; G06V 30/10
See application file for complete search history.

(56) References Cited

U.S. PATENT DOCUMENTS

| | | | | |
|---|---|---|---|---|
| 9,785,696 | B1 * | 10/2017 | Yakhnenko | G06F 16/9024 |
| 9,836,183 | B1 * | 12/2017 | Love | G06F 16/904 |
| 9,911,211 | B1 * | 3/2018 | Damaraju | G06F 16/9024 |
| 11,263,223 | B2 * | 3/2022 | Jiang | G06F 16/285 |

* cited by examiner

*Primary Examiner* — Jeffery A Brier
(74) *Attorney, Agent, or Firm* — Davis Wright Tremaine LLP

(57) ABSTRACT

A data-processing system identifies entities and relationships between entities that are recited in a set of documents. By identifying differently-named entities that share similar sets of relationships, the system is able to identify differently-named, but identical entities recited in the set of documents. The resulting entity and relationship map may be displayed to an end-user for intelligence analysis. In some examples, the end-user may make corrections to the relationship map which can then be used by the system to improve the inferences produced.

20 Claims, 8 Drawing Sheets

GRAPHICAL DATA DISPLAY

BACKGROUND

Textual information is produced in a variety of ways including computer log files, legal documents, newspaper articles, social media information, electronic mail, text messages, business documents, financial information and data, research, intelligence gathering, and government reports. Organizing, analyzing, and synthesizing all this information is a very challenging task at least in part because of the vast amount of potential information to be searched. Search engines seek to generate indexes that provide keyword search capabilities. Even so, existing techniques may not provide the level of granularity required or may not have the ability to discover many types of information relationships. Therefore, the development of improved information processing and analysis systems is an important area of research.

BRIEF DESCRIPTION OF THE DRAWINGS

Various techniques will be described with reference to the drawings, in which.

DETAILED DESCRIPTION

Figure 1:
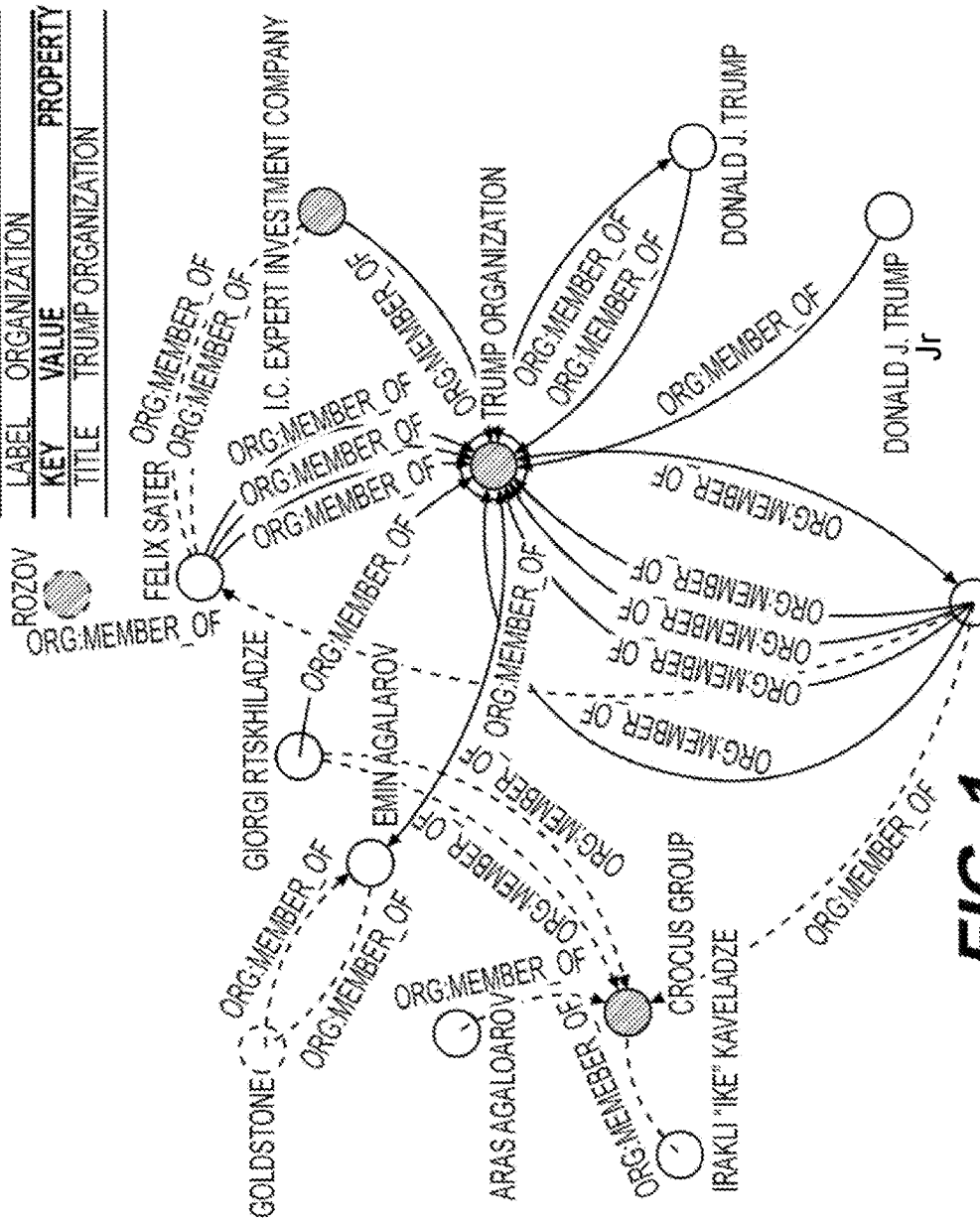
FIG. 1 illustrates an example of a display that shows the relationships between entities mentioned in a first set of documents, in an embodiment.

The present document describes a system that produces a knowledge graph that represents entities and relationships between entities mentioned in a corpus of text-based documents. In at least one example, the system identifies relationships between entities and aliases used between documents to describe a single entity. The relationships and aliases can be presented graphically as series of nodes and edges. In at least one embodiment, the user can interact with the graphical display to correct relationships between entities, indicate aliases for the same entity, or disambiguate entities. Corrections made by the user can, in various examples, be used to update other relationships and improve the ability of the system to automatically identify relationships between entities.

In various examples, the system processes text-based documents at the sentence level to identify entities referred to, and relationships between entities. Text-based documents may include word processing documents in various formats such as Microsoft Word, Wordperfect, Google Docs, Rich text format ("RTF"), Portable Document Format ("PDF"), or plain text. Entities may include people, organizations, organizational roles or titles, products, countries, governments, product components, sources, computer servers or systems, websites, web servers, or things. Relationships identified by the system can include alias relationships such as a relationship between a person and a role (for example, John is an approver of all changes), or a person and an organizational position (for example, John is president of ABC Corporation), or a person and a title (John is Chairman of the committee). Other types of relationships include relationships between people such as employer-employee relationships, coworker relationships, familial relationships, customer relationships, or identity group relationships. Additional types of relationships can be tracked between products and organizations such as supplier relationships, product-component relationships, and financial arrangements between organizations and companies. In some examples, the system identifies and diagrams relationships between information such as the source of information and the consumer of such information.

Finding relationships between entities is both an important natural language processing task ("NLP") and an important problem for customer data analysis. For example, it is important for analysts working in national security, where they may be faced with the task of digesting a large volume of text and producing reports based on the relationships between people, places, organizations and events within those documents. This problem can be broken down into a series of NLP tasks: identifying named entities, inter-document co-referencing, predicting relationships, and finally cross document co-referencing. In the present document, a framework is described that tackles each of these NLP subtasks. In some examples, a deep neural network is built and trained for extracting entities, predicting co-reference relationships between entities, and classifying relationships.

Various embodiments of the system described herein provide a relationship extraction tool that creates domain specific knowledge bases from text documents. The system accomplishes this by extracting relationships between entities in a corpus, linking them together, and disambiguating entities based on their relationship to other extracted entities. By creating domain specific knowledge bases, the system addresses a key problem that customers have: determining how entities (the people, places, organizations and things they care about) are associated with one another. Many customers have large collections of text documents that represent the institutional knowledge about a particular subject. For instance, in financial services, these could be things like financial reports (10K, ratings, etc.) about a company or municipality. In law, these documents might come from the discovery phase of a litigation proceeding. In government, documents may include analyst reports or collected documents about a particular subject or region. While key word searches can find documents that mention specific individuals, organizations, places, or things, such systems do not provide context. For instance, "Alice" may be of minor interest by herself, but if "Alice" works with "Bob" who is of interest, then "Alice" is more interesting by association. At least one embodiment described herein has the capability of extracting these relationships and linking across a corpus, giving the analyst more context in how different entities are related to one another.

By extracting relationships, embodiments assist analysts with the time-consuming task of disambiguating entities. Ambiguous entities may appear in knowledge graphs extracted from text, and disambiguating these entities is a challenge. For instance, customers have cases where an individual is referred to by an alias or pseudonym in one set of documents but by a true name or family name in another set. Analysts may disambiguate these cases by reading each set of documents and understanding how the references (the alias and the true name) are related to other entities (e.g. a birth place, an employer, a job title, a brother, etc.). Embodiments described herein automate this process by using the extracted relationships between entities to link potentially identical entities in the knowledge graph.

Some examples go beyond traditional entity linking or entity resolution. For example, extracted entities may be resolved to items that already exist in a knowledge base. Depending on the volume of new documents created on a daily basis, the number of entities not in a knowledge base may be growing. Various embodiments are able to link extracted entities that are outside of the knowledge base. For customers, this can be important, since often the questions they have are how unknown entities are related to known quantities.

Various embodiments of a system may provide one or more of the following features or advantages:

1. A process for extracting named entities from text documents called name entity recognition ("NER"). This step extracts the people, places, things and organizations that are of interest.

2. A process for linking co-referenced entities within a text document. This step links spans of text that refer to the same entity. Spans of text could be substrings of earlier referents, pronomials associated with earlier referents, or entire parenthetical statements associated with earlier referents. This step associates these different spans of text as referring to the identical entity.

3. A process for classifying relationships. This step breaks the document into sentences and looks at all sentences with two or more entities in them. This step takes each pair of entities in the sentence and classifies the relationship between the entities as described by the sentence, if any.

4. Results from the previous steps provide triplets of (entity 1, entity 2, relationship). These results may be placed in a graph database for visualization and additionally graph analytics.

5. The system computes node similarity scores between entities in the extracted graph. For nodes that are highly similar to one another, the system indicates to the user that these nodes may be identical. In some examples, node similarity can be determined via neural graph embedding models. In other examples, node similarity can be determined by a local scoring function based on the local connections between nodes.

6. A graphical user interface that visualizes the extracted graph and allows a user to explore the graph using a web browser. Additionally, users are able to correct incorrectly labelled edges which are collected by the system in order to improve relationship predictions in subsequent iterations.

Classifying relationships between entities in a corpus is both an important Natural Language Processing ("NLP") task and an important problem that customers face in the national security space. For example, analysts working in national security are tasked with digesting large corpora of documents and with extracting relationships between people, places, organizations and events described in the corpus of documents. The techniques described herein provide a framework that extracts entities from a corpus, co-references mentions within a document, classifies the relationship between entities extracted, populates a knowledge graph with the predicted relationships, and provides a graphical user interface ("GUI") for end users to search and explore the knowledge graph. In various examples, the framework leverages a pre-trained language BERT model that incorporates information about entities to tackle the relationship classification problem. The pre-trained language model may not rely on the relative position of the extracted entities, since these are generally unavailable in customer datasets. Various embodiments achieve state-of-the-art results on the SemEval-2010 task 8 relational dataset and TAC relationship extraction dataset, as shown below.

In some examples, the task of relationship classification is central to the framework. The task of relation classification involves predicting semantic relations between pairs of names. For example, given a sentence s and a pair of names e1 and e2, the objective is to identify the relation between e1 and e2. In some examples, deep neural networks may be applied to relationship classification. Some examples use some feature engineering utilizing Word-Nets or dependency parse trees. In various examples, each component is highly customizable and the system allows users to train specific machine learning models for each of the steps mentioned above.

Deep neural networks may leverage pre-trained language models to achieve state-of-the-art results on a variety of NLP tasks. For example, BERT, proposed by (Devlin et al., 2018) may be used in a number of contexts to great effect. It is applied to NLP tasks such as relationship classification in one or more examples described herein. Techniques described herein expand on earlier approaches and utilize BERT to encode entities as well as the sentence (corresponding to the embedding of the special first token in the setting of BERT). These encodings are then fed as inputs to a multi-layer neural network for classification. The mode is trained to ignore the ordering of entities because these may be unavailable in customer use cases. These annotations, while available in most academic datasets, are obtained via human annotation. Despite this handicap, various examples still achieve state-of-the-art results for a relationship classifier.

Various examples classify relationships between spans occurring in a sentence for every sentence in a document, and therefore proceed to co-reference spans that refer to the same entity. While some examples classify relationships between spans in a single sentence, other examples classify relationships between spans occurring in excerpts that can be comprised of sentences, clauses, paragraphs, or even word sections of fixed word length. For example, it is common for entities in an intelligence report or news article to be mentioned by their full first and last name initially, but referred to simply by their last name later on. In more general settings, entities can be referred to by their pronouns. In various implementations described herein, the system tailors a solution that works specifically for co-referencing entities in documents generally adhering to AP style (e.g. entities are referred to by their full names initially and then by their last names later) as this is the most common format used by customers. Some embodiments do not do co-referencing in the more general sense of linking pronouns and phrases together with entities.

Various examples are described that extract relationships between entities in a corpus of documents. By chaining several NLP steps, NER, co-reference resolution, and relationship extraction, a system for extracting and visualizing relationships for a class of documents of interest to customers is produced. For an intelligence-gathering use case, this methodology is likely to be of interest to those working in automatic knowledge graph creation from text more broadly.

In one example, the problem of finding relationships between entities in a corpus can be segmented into several sub-NLP problems: for each document the system performs a Named Entity Recognition ("NER") step, a co-referencing step, and finally a relationship classification step. Some examples provide a visual framework for exploring large graphs of information.

In some examples, as a first step in the framework, named entities are extracted. To accomplish this, a Comprehend service may be used to detect entities. This can be advantageous since it off-loads management and deployment of the service. In addition, there is a mechanism to train and deploy a highly scalable NER service once training data has been generated. In initial studies, the built-in types from the Comprehend service were implemented and the system tracked entities tagged as PERSON, LOCATION, ORGANIZATION, EVENT, or TITLE. With entities recognized, an embodiment can tokenize the document into sentences and look at sentences that have at least two entities. Pairs of entities within each sentence are passed to the classifier to classify any potential relationships between the entities.

In addition to NER, co-reference resolution is performed. Several methods may be used for co-reference resolution, including several state-of-the-art neural network methods. In one example, a mention-pair heuristic is utilized.

In common practice, it is the custom to refer to individuals first by their full name and potentially title, e.g. "President Barack Obama" or "President Andres Manuel Lopez Obrador", in order to disambiguate, within the document, to whom they are referring. Later in the article, the same individual is most often referred by a subset of tokens, e.g. "Obama" or "Lopez Obrador." This is a feature of AP style that is commonly used in official government communications as well.

To that end, a mention-pair heuristic is provided to link mentions such as "President Barack Obama" with a mention such as "Obama" or "Barack Obama". In some examples, mentions who are referred to by their pronomials or referred to by their titles, e.g. "President" or "The U.S. President" are not linked. In order to link mentions within a document, one embodiment uses components of a multi-pass sieve for co-reference resolution (Raghunathan et al., 2010).

In some examples, the following algorithm outlined in the table below may be used.

Algorithm 1 Token Overlap Coreferencing
1: SortedMentions←Sort mentions from start to end of document
2: SortedMentionPairs←Get all pairwise combinations of mentions with the same NER type in SortedMentions.
3: for mention pairs ($m_1$, $m_2$) in SortedMentionPairs do
4: Tokens1←Remove stopwords and tokenize $m_1$
5: Tokens2←Remove stopwords and tokenize $m_2$
6: if Tokens2 appear in Tokens1 then
7: $m_2$ is a coreference for $m_1$.
8: else
9: $m_1$ is not a coreference for $m_2$. continue
10 end if
:
11 end for
:

At least one example utilizes a pre-trained BERT language model that is fine-tuned for relationship classification. The pre-trained BERT language representation model is a multilayer bidirectional transformer encoder. The parts BERT utilized for relationship classification are described herein. The input to BERT may be a single sentence that has been annotated with special tokens. A special token [CLS] is the first token of each sequence. Additionally, the system inserts special tokens to indicate entity positions within the sentence. Below, the model architecture used to fine tune BERT for relationship classification is described.

In at least one example, given a sentence s, the system inserts four special tokens [e11], [e12], [e21], [e22] to indicate the start and end of the first entity in s and the start and end of the second entity in s to capture the positions of the entities ($e_1$; $e_2$). To fine-tune BERT, the system may use the WordPiece tokenizer and append a special [CLS] token to the beginning of the sentence. The tokenized sentence may be passed into the BERT encoder. Examples of the system use the locations of the special tokens [e11], [e12], [e21], [e22] to identify the final encoding of the entities ($e_1$; $e_2$). The resulting contextual representations of the entities ($e_1$, $e_2$) are labeled as $E_{1i}$ and $E_{2j}$ respectively. Here, i; j indicate the (potentially) multiple tokens corresponding to the WordPiece tokenization of either entity $e_1$ or $e_2$.

In various examples, the sequence of embedding E from the BERT encoder corresponds to the task-specific embedding of each token in the WordPiece tokenized representation of the sentence s. The first of these $E_0$ labels the embedding of the first special token [CLS] in the sequence. The system applies a Dropout layer and a fully-connected activation layer to obtain an embedding vector $E_0$, i.e.:

$$E_0' = W_0 \tanh(E_0) + b_0 \qquad (1)$$

In at least one example, using the special tokens [e11], [e12], [e21], [e22], the system identifies the location of the embeddings that correspond to the token sequences of $e_1$ and $e_2$ respectively. Contextual embeddings of these tokens may be denoted as $E_{1i}$; and $E_{2j}$ respectively. Since $E_{1i}$ and $E_{2j}$ can potentially include n≥1 and m≥1 token embeddings, the system applies an averaging procedure to get an average embedding $E_1$ and $E_2$ for $E_{1i}$, $E_{2j}$ respectively. Finally, the system applies an additional dropout layer to both embeddings and applies a fully connected activation layer to both.

$$E_1 = W_1 \left[ \tanh\left( \frac{1}{n} \sum_{i=1}^{n} E_{1i} \right) \right] + b_1, \qquad (2)$$

$$E_2 = W_2 \left[ \tanh\left( \frac{1}{m} \sum_{j=1}^{m} E_{2j} \right) \right] + b_2$$

Finally, at least one example further sets $W_1 = W_2$ and $b_1 = b_2$. In at least one example, they share the same set of parameters. The system then concatenates the three resulting vectors which are fed through another faith fully connected layer.

$$E^N = W_3[\text{concat}([E_0', E_1, E_2])] + b_3 \qquad (3)$$

In at least one example, E" is converted to a probability using a softmax. This gives the predicted probability p for each relationship class:

$$p(y|x, \theta) = \text{softmax}(E") \qquad (4)$$

In at least one example, to train the model, a rank loss function may be used such as one described in Santos et al., 2015 which has been shown to give good results on the SemEval8 dataset. The total loss function for a batch of size k may be given by:

$$L = -\sum_{i=1}^{k} p(y^+ | x, \theta) - \beta \sum_{i=1}^{k} \log(1 - p(y^- | x, \theta)) \quad (5)$$

In this example here, $y^+$ is the correct relation label and $y^-$ is the most likely incorrect label. In one example, the loss function is optimized for getting the correct label correct with high probability and the incorrect label with low probability. The contribution from $p(y^-|x,\theta)$ is weighted by the hyperparameter $\beta$. In one example, because both evaluation sets SemEval8 and TACRED contain a broad catch-all category (Other and no relation respectively), the loss is determined based at least in part on other relations excluding these two.

One component of the framework, the relationship classifier, may be benchmarked on two different academic datasets, the TAC relation Extraction Dataset (Zhang et al., 2017) and the SemEval 2010 Task 8 dataset (Hendrickx et al., 2010), described below.

The TAC Relation Extraction Dataset (TACRED) (Zhang et al., 2017) contains 106 k sentences with entity mention pairs collected from the TAC KBP evaluations5 2009-2014, with the years 2009 to 2012 used for training, 2013 for evaluation, and 2014 for testing. Sentences are annotated with person and organization oriented relation types. The results are reported as micro-averaged F1 scores on true relationships, excluding no relation.

The SemEval 2010 Task 8 dataset (Hendrickx et al., 2010) contains 8K sentences for training, and 2,717 for testing. Sentences are annotated with a pair of untyped names and one of 9 directed semantic relation types, such as Cause-Effect, Entity-Origin, as well as the undirected Other type to indicate no relation, resulting in 19 distinct types in total. The macro-averaged F1 scores are reported on true relationships, excluding Other.

Table 1 below illustrates an example of hyperparameter settings used in experiments and evaluation of the relationship classifier against standard benchmarks. The batch size is set to 16 and epochs is set to 4 in both contexts. Parameters of the pre-trained BERT model may be found in Devlin et al., 2018.

TABLE 1

Parameter Settings

| Evaluation Set | Max Sequence Length | Learning Rate | β | Dropout |
|---|---|---|---|---|
| SemEval8 | 128 | 2.59e−6 | 1.06 | 0.1 |
| TACRED | 256 | 1.34e−5 | 1.00 | 0.1 |

TABLE 2

Model Performance

| Model | f1: SemEval8 | f1: TACRED |
|---|---|---|
| Baldini Soares et al., 2019 | 0.895 | 0.715 |
| Wu et al. 2019 | 0.893 | — |
| Zhang et al. 2018 | — | 0.682 |
| Ours | 0.891 | 0.675 |

The model architecture is benchmarked against two well-known datasets, the newer TACRED dataset and the SemEval8 dataset. One use case did not utilize the relative position of the entities occurring in a sentence. In some situations, this is a minor handicap in that some relationships occurring in the academic datasets are in reverse order. That is, the "tail" entity precedes the "head" entity. Ignoring the relative position may be desirable, because in real settings with customer data, ordering the entities is not possible and generally not available. Despite this handicap, the techniques described here achieve results that are in line with state-of-the-art methods. Results are summarized in the Table 1 above.

In one example, the NER step of the pipeline utilized the built-in types, but only considered relationships between PERSON, LOCATION, ORGANIZATION, EVENTS and TITLE types. Additionally, various examples used spaCy for sentence tokenization, and for inter-document co-reference resolution.

One example trained the model specifically on the TACRED dataset since this dataset is more focused on people, places, organization, events and dates that are of interest to customers. TACRED data is also sourced from news articles which bears resemblance to customer data.

A graph database was utilized for the frontend UI. The framework performance was tested on two different datasets, the Mueller report and the bin Laden bookshelf. Because of payload size limitations, the documents were divided into separate documents of size less than 5 kB.

FIG. 1 illustrates an example of a display that shows the relationships between entities mentioned in a first set of documents, in an embodiment. In the example shown in FIG. 1, the document corpus is a set of documents relating to the Trump organization. The analysis process extracts the names of entities mentioned in those documents such as the Trump organization itself, Donald J Trump, and Donald J Trump Junior. Relationships are extracted from the context within the document. The resulting network of entities and relationships is presented to the user as a graphical display such as the display illustrated in FIG. 1. In some examples, entity types are shown using different types of shading or colors, and relationship types are differentiated using different line patterns. Various statistics regarding the graph are shown on the right and left sides of the display. The statistics may include things such as the number of entities, the number of events, the number of organizations and the types of relationships detected during analysis.

Figure 2:
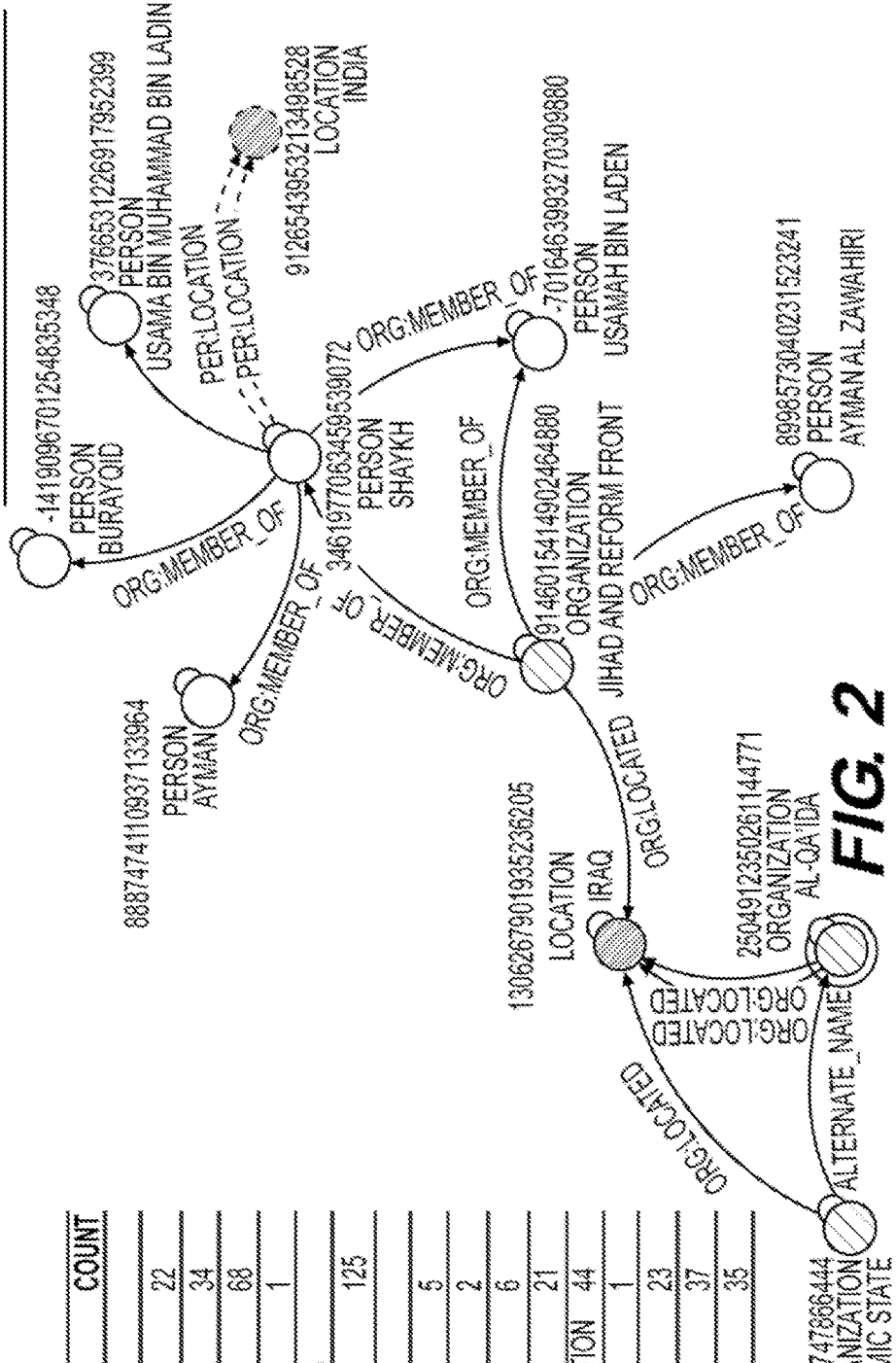
FIG. 2 illustrates an example of a display that shows the relationships between entities mentioned in a second set of documents, in an embodiment.

FIG. 2 illustrates an example of a display that shows the relationships between entities mentioned in a second set of documents, in an embodiment. FIG. 2 illustrates another example of information provided using the techniques described herein. In the example illustrated in FIG. 2, the document corpus is a set of documents relating to Al Qaeda. Various entities such as Osama bin Laden and Ayman Zawahiri are illustrated, as well as relationships they have to common organizations such as the Jihad and Reform Front. The data presentation illustrated in FIG. 2 shows relationships such as common locations that organizations or people are operating in or associated with. For example, both the Islamic state and Al Qaeda are shown to be associated with Iraq within the set of documents analyzed by the system.

In some examples, the display of the graph may be modified by a user "tree walking" the graph. For example, if the graph is large, it may be difficult to display the entire graph, when a user selects a node of the graph, the system centers the display of the graph around the selected node so that the nodes nearest the selected nodes are visible on the display. In addition, some implementations display edges of the graph in different colors or textures to indicate a confidence in the relationship in-line with a similarity score or other measure. A texture may be a shade, color intensity, or pattern applied to a line. For example a dashed line may indicate a probable connection, or a dotted line may indicate only a possible connection.

Figure 3:
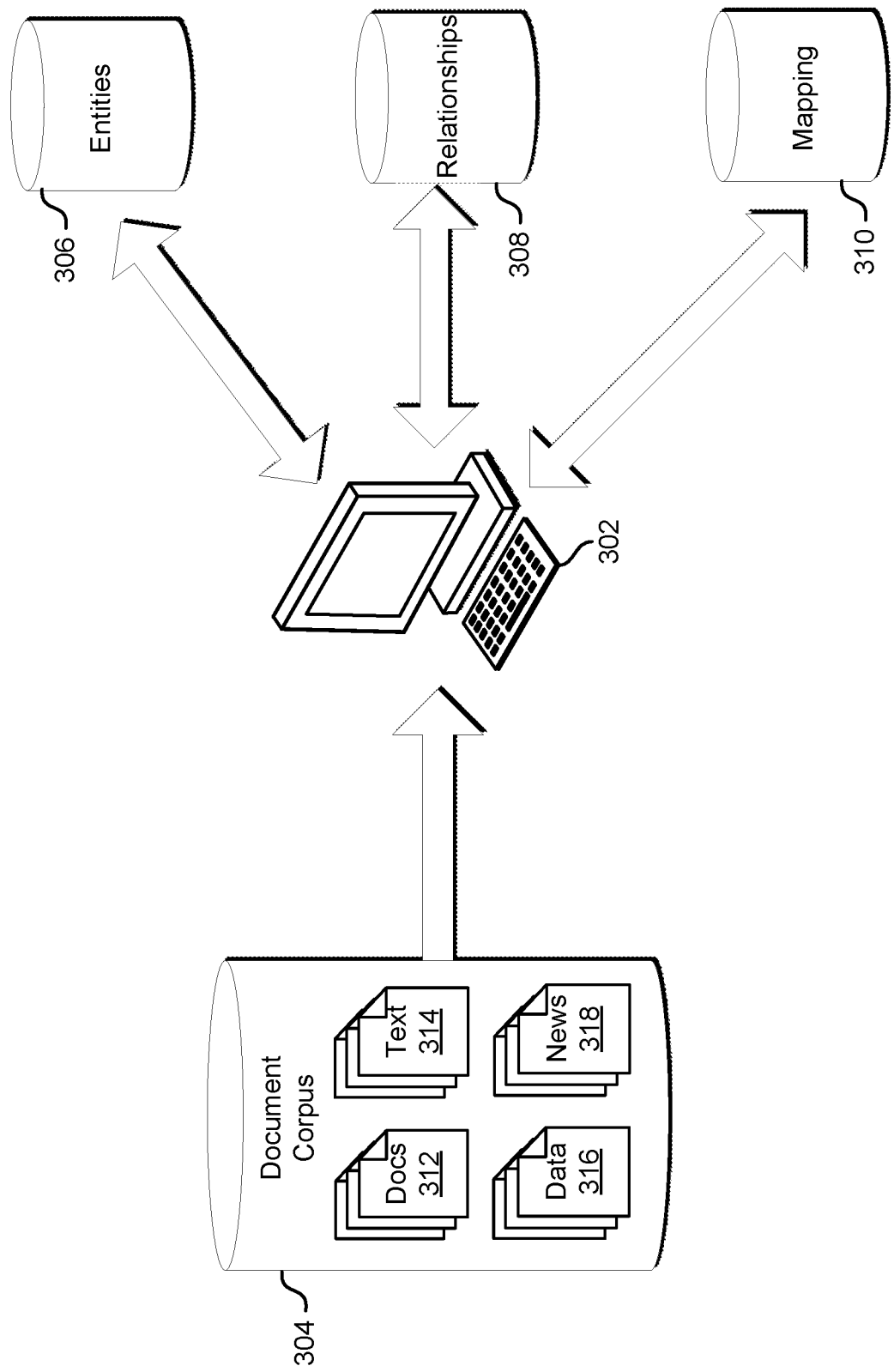
FIG. 3 illustrates an example of a system that identifies entities and relationships between the entities from a corpus of documents, in an embodiment.

FIG. 3 illustrates an example of a system that identifies entities and relationships between the entities from a corpus of documents, in an embodiment. In one embodiment, the computer system 302 has access to a storage device that stores a corpus of documents 304. The storage device can be a disk drive, nonvolatile memory, network storage device, optical storage device, or data storage service accessible to the computer system 302. The document corpus can store a variety of different document types including one or more word documents 312, one or more text documents 314, one or more data files 316, and one or more news articles 318. In various examples, the documents may include documents that store textual information in ASCII, BCD, Unicode, or various text encodings. Some examples may include documents that are stored in image formats where the images represent the visual appearance of text documents. Such documents may be processed using optical character recognition and processed by the computer system in a manner similar to other text documents. Some documents, such as web files, may include a plurality of document portions, templates, and linked subdocuments.

In one example, the computer system 302 reads individual documents from the document corpus 304 and identifies entities mentioned within each document. Entities may include people, places, organizations, governments, events, products, product components, or other documents. In at least one example, the computer system 302 parses each document into a set of sentences. In some examples, the computer system 302 may parse each document into phrases, lines, or other sub portions. In one example, the computer system 302 parses each document into a set of document portions where each document portion is a fixed number of words. Within each document portion, the computer system 302 identifies the entities mentioned in stores as entities in an entity store 306. The entity store 306 can be a file on a storage device such as any of the data storage devices described herein.

The system then attempts to identify relationships between the entities based on the context in the document. For example, a document may mention "Barack Obama", and the position "President of the United States" causing the computer system to associate the entity "President of the United States" with "Barack Obama". Based on context of the document, the system may identify that Barack Obama is the president of the United States or that Barack Obama met with the president of the United States. In another example, a document may mention Barack Obama and the Democratic Party along with the phrase "member of" or "joined" and infer that the entity "Barack Obama" is a member of the entity "The Democratic Party". The mappings identified by the computer system 302 are stored in a relationship database 308 that records the linkages between entities stored in the entity store 306. In one implementation, the relationship database 308 stores pairs of links to two entities in the entity store 306, and a relationship type that identifies the type of relationship between the two entities. Relationship type may be, in various examples, a membership, alias, colocation, parent-child, employee-employer, or other kind of relationship identified by the system.

In various examples, the computer system 302 examines the relationships associated with different entities in the entity store 306, based at least in part on similarities between relationships. The system is able to infer that two entities having different names may in fact be the same entity based on the fact that the relationships that entities have appear to be similar. For example, the system may note that the two different named entities have similar familial relationships, similar employment relationships, and similar co-locations that suggest that the entities may be closely related or perhaps identical. This may be used, for example, to identify confidential sources, locations of interest, or people of interest in an investigation. In some examples, a location may be specified using a coordinate system, address, or latitude/longitude. In other examples, a location may be indicated as a named place. In one implementation, the system generates a similarity score that provides a measure of similarity between two sets of relationships. In one example, the similarity score is generated by a trained network that is trained using labeled data.

In various examples, a similarity score is a number that can be used to represent the similarity between two entities. In one implementation, the similarity score is generated by determining the number of identical relationships between two entities. For example, if entity A is related to entity X, Y, and Z, and entity B is related to entity X, Y and W, entity A and entity B would have a similarity score of two. As an adjustment to the similarity score, some implementations may subtract for relationships that are not common to entity A and entity B. Some implementations may provide different weight to shared relationships based on the type of the relationship. For example, a parent-child relationship may be given greater weight than an employer-employee relationship with respect to determining a similarity score. In some implementations, graph similarity metrics can be used where the graph of nodes connected to a first entity are compared to the graph of nodes connected to a second entity. For example, the similarity score can be based on aggregate measures of graph structure such as degree distribution, diameter, or betweenness measures. In some examples, a similarity score can be developed using edge similarity scores or node similarity scores.

Figure 4:
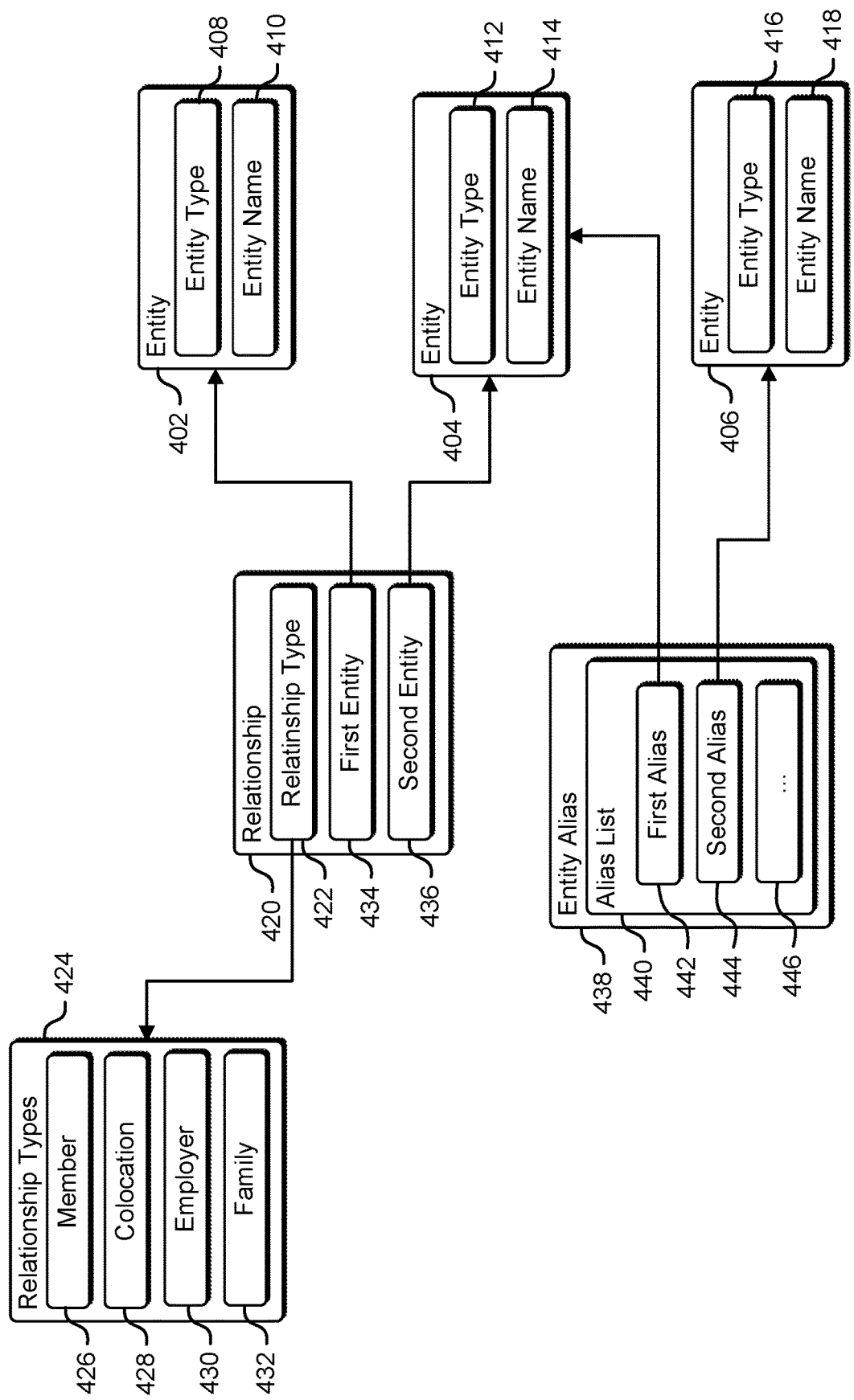
FIG. 4 illustrates an example of a data architecture for representing relationships between entities, in an embodiment.

FIG. 4 illustrates an example of a data architecture for representing relationships between entities, in an embodiment. Individual elements and structures described in FIG. 4 may be stored in computer-readable memory by a computer system to represent a graph of entities and relationships between entities. Links between structures can be implemented as indexes or pointers. The individual structures can be statically allocated in a structure such as an array or dynamically allocated on allocation stack so that individual records can be recorded or deleted by the system. In at least one embodiment a collection of entity records such as the first entity record 402, a second entity record 404, and a third entity record 406 are identified within documents and stored by the system. Each entity record includes an entity type and an entity name. The first entity record 402 includes a first entity type 408 and the first entity name 410. The second entity record 404 includes a second entity type 412 and a second entity name 414. The third entity record 406 includes a third entity type 416 and a third entity name 418. Entity type can, in various examples, be an enumerated type that can identify the entity as a person, place, organization, product, or other entity type described herein.

The system maintains a set of relationship records 420. Each relationship record 420 has a first entity link 434 and the second entity link 436 that point to the two entities that are related. A relationship type field 422 points to an element of a relationship type record 424. The relationship type field 422 maintains a list of relationship types identified by the system. In one example, the relationship type record 424 identifies membership relationships 426, co-location relationships 428, employer-employee relationships 430, and familial relationships 432. In addition to relationships between entities, the system may generate one or more alias records 438. An alias record includes an alias list 440. The alias list 440 includes a set of pointers that may include a first alias pointer 442, a second alias pointer 444, and additional alias pointers 446. The entities pointed to by the alias pointers indicate entities that are identical entities identified using different names. For example the entity named "Barack Obama" may have an alias named "Obama" and another alias named "POTUS".

The combination of entity records, relationship records, and alias records allows the computer system to store information describing entities, their types, and the relationships between those entities. In various examples, such information is represented graphically with nodes representing individual entities, and the edges between nodes representing relationships between entities.

Figure 5:
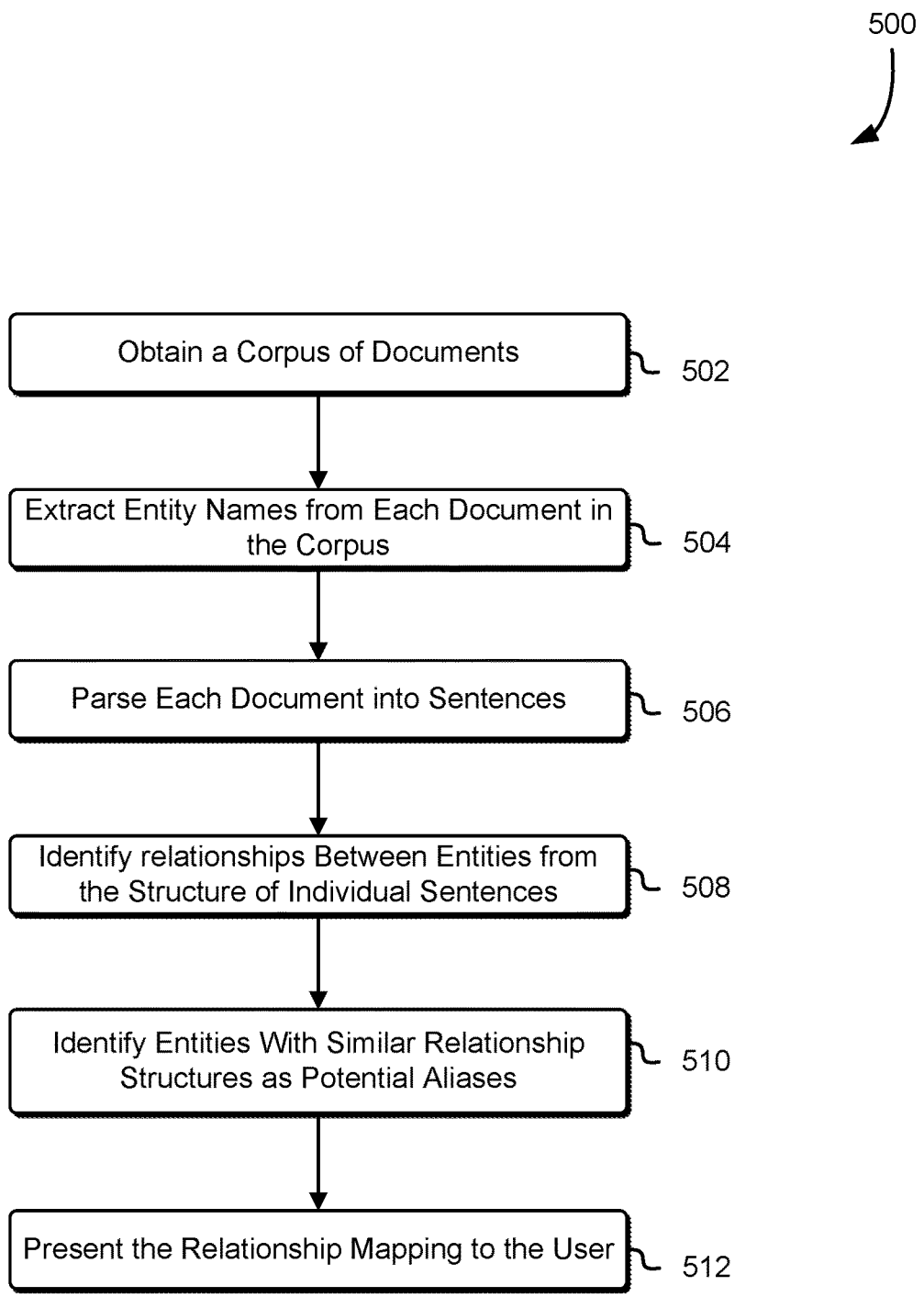
FIG. 5 illustrates an example of a process that, as a result of being performed by a computer system, identifies entities mentioned in a set of documents, in an embodiment.

FIG. 5 illustrates an example of a process 500 that, as a result of being performed by a computer system, identifies entities mentioned in a set of documents, in an embodiment. The computer system includes one or more processors connected to computer-readable media that stores executable instructions. As a result of the executable instructions being executed on the one or more processors, the computer system performs the various steps and operations described below.

At block 502, the computer system obtains a corpus of documents. The corpus of documents can include one or more documents of one or more types, including documents in different languages, different text formats, and images containing text. At block 504, the computer system processes each document in the corpus and extracts entity names that are mentioned in each document. The computer system attempts to derive a type from context such as a person, place, an event, and so on. At block 506, the computer system parses each document in the corpus into a collection of individual sentences. Within each sentence, the computer system identifies if two or more entities are referred to, and attempts to discern a relationship 508 between the two or more entities based on the context within the sentence. In some examples, the system uses context from earlier sentences to infer the entity referred to by pronouns in a later sentence. For example, if a document refers to a person named Joe, and the next sentence says that "his son is named Mark," the system will parse the previous sentence to infer that "his" refers to Joe's, and that there is a relationship between Joe and Mark of father-son.

After discerning the entities and relationships on a per-sentence basis, some examples of the system attempt to identify entities that may be referred to by different names in the same or different documents but in reality are the same entity. In one example, at block 510, the system examines entities that have similar relationships by determining a similarity score for the set of relationships associated with the first entity and the set of relationships associated with the second entity. If the similarity score exceeds a threshold value, the first entity and the second entity are assumed to be the same entity and the system records, in computer readable memory, that the first entity and the second entity are the same entity. In some implementations, this is accomplished by deleting either the first entity or the second entity, and merging the relationships of the two entities by ensuring that the remaining entity has all the relationships previously present in either of the two entities. In some examples, the system proposes the first entity and second entity as being potentially identical. In some examples, the system only proposes the identities to be identical if they have the same entity type.

At block 512, the system takes the entity and relationship data determined above, and presents a relationship map to an operator. The relationship map presents each entity as a node, and each relationship is an edge between the nodes. Some embodiments label the nodes and edges. Some embodiments use line textures or colors to denote different entity types or relationship types. In some examples, the interface presented to the user is editable so that the user can add additional relationships that are known to the user, or correct relationships that are incorrectly inferred by the system.

Figure 6:
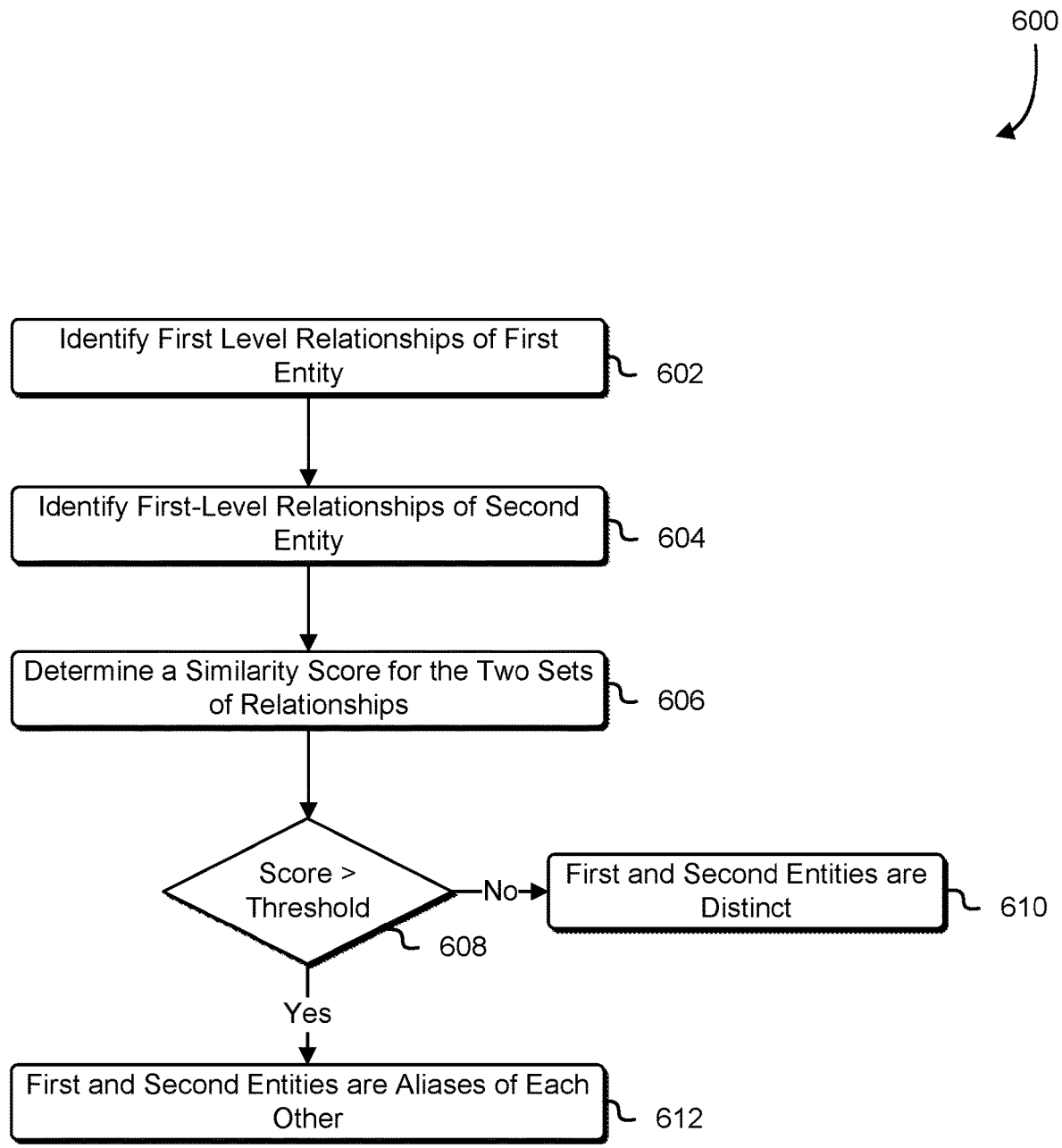
FIG. 6 illustrates an example of a process that, as a result of being performed by a computer system, identifies aliases of entities mentioned in a set of documents, in an embodiment.

FIG. 6 illustrates an example of a process 600 that, as a result of being performed by a computer system, identifies aliases of entities mentioned in a set of documents, in an embodiment. The computer system includes one or more processors connected to computer-readable media that stores executable instructions. As a result of the executable instructions being executed on the one or more processors, the computer system performs the various steps and operations described below.

In one example, at block 602, the computer system identifies a set of relationships that are associated with the first entity. The relationships are those which directly connect a first entity to another entity of any type. At block 604, the computer system identifies a second set of relationships that directly connect a second entity to other entities. The two sets of relationships may share similar connections. For example, the first set of relationships may note that the first entity works for a third entity, and the second entity also works for the third entity. These two relationships are equivalent, apart from being associated with the first entity and the second entity.

At block 606, the computer system examines the two sets of relationships and develops a similarity score that represents the similarity of the relationships exhibited by the first and second entities. In general, two sets of relationships are similar if, apart from the entities around which the relationships are centered, they share similar relationship types and target entities. Greater numbers of similar relationships generally lead to a higher degree of similarity represented in the similarity score. At decision block 608, the computer system compares a similarity score to a threshold value, and if the similarity score exceeds the threshold value, execution advances to block 612. If the similarity score does not exceed the threshold value, execution advances to block 610 and the system determines that the first entity and the second entity are distinct different entities. If the similarity score exceeds the threshold value, execution advances to block 612 and the system determines that the first entity and the second entity are likely the same entities referred to with different names.

Figure 7:
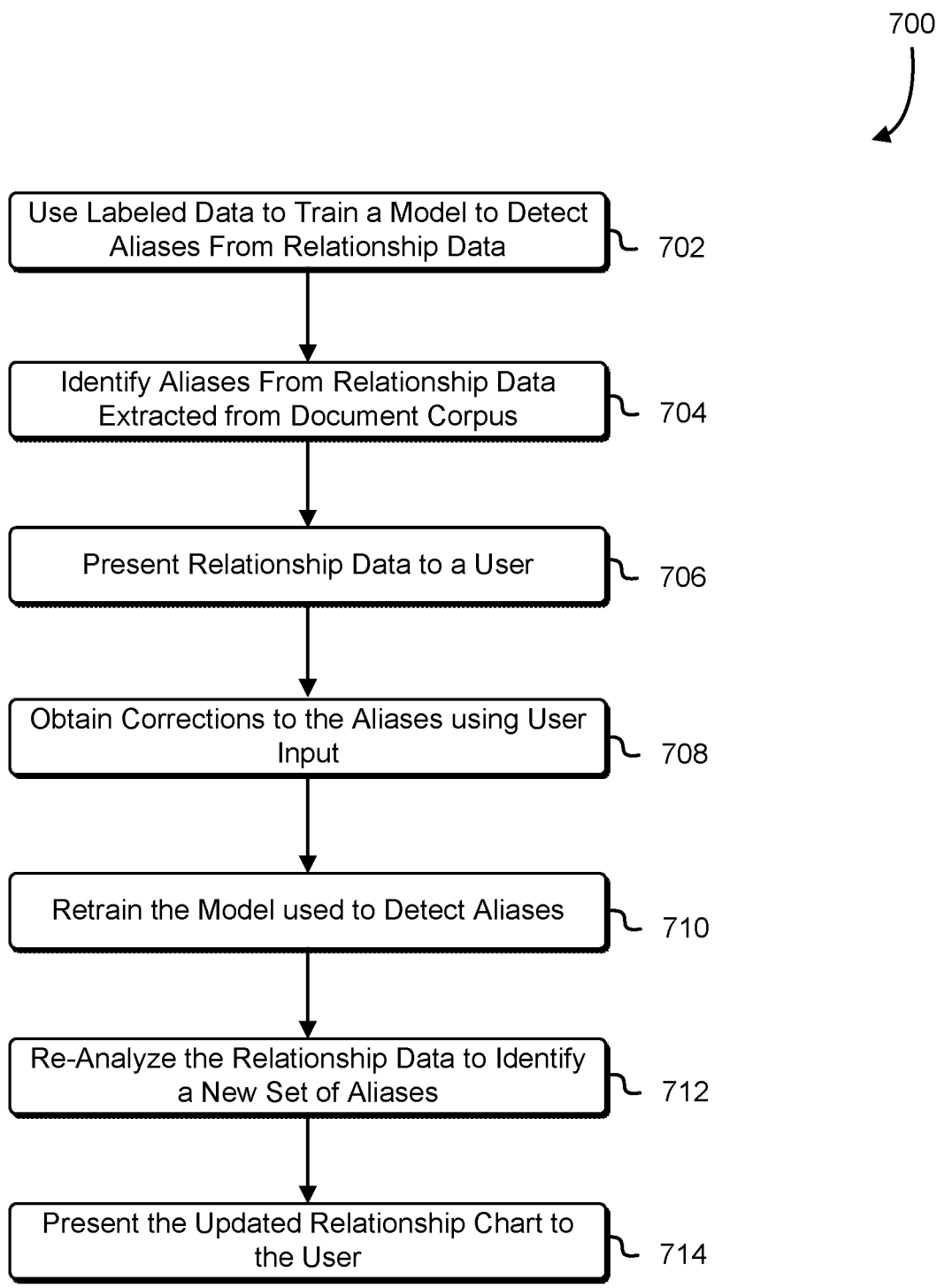
FIG. 7 illustrates an example of a process that, as a result of being performed by a computer system, trains a model to identify aliases of entities mentioned in a set of documents, in an embodiment.

FIG. 7 illustrates an example of a process 700 that, as a result of being performed by a computer system, trains a model to identify aliases of entities mentioned in a set of documents, in an embodiment. The computer system includes one or more processors connected to computer-readable media that stores executable instructions. As a result of the executable instructions being executed on the one or more processors, the computer system performs the various steps and operations described below.

In at least one example, at block 702, the computer system uses label data to train a machine-learned model to detect aliases using labeled training data. In one embodiment, for example, the computer system trains a model to generate a similarity score that represents the amount of similarity between two sets of relationships. At block 704, the computer system is provided with customer data extracted from a document corpus. The computer system uses the train model to identify entities mentioned in the document corpus that are aliases of each other. At block 706, the resulting network of entities and relationships is presented to a user on a graphical display with individual nodes representing individual named entities, and edges representing relationships between the entities. At block 708, the user is allowed to make corrections or additions using the graphical display. Corrections can include eliminating or adding a relationship, adding entities, or indicating that entities that have different names are in fact the same entity. In some examples, differently named entities that are determined by the system to be identical may be corrected by a user to indicate that the differently named entities are in fact different entities.

At block 710, the corrected model is used as training data to retrain the machine-learned model. In this way, corrections provided by the user can be used to provide improved recognition of aliases going forward. At block 712, the data provided by the user is reanalyzed to identify aliases, taking into consideration the corrections made by the user. The corrected data generated with the updated model can then be presented to the user 714. In some examples, the updated model can be presented as a graph where individual entities are displayed as individual nodes of the graph and edges of the graph represent relationships between the connected nodes. Each pair of nodes may have zero, one, or a plurality of edges connecting them. In some examples, entities of different types can be represented by nodes of different color, texture, or pattern. Different types of relationships between nodes can be represented as lines having a different color or different pattern.

In some examples, the computer system includes a connected display device and display data produced by the system in the form of a bitmap, raster image, or vector image is displayed on the display device. A display device can be a raster device, LCD, plasma display, vector display, or hardcopy device such as a printer or plotter. In other examples, the computer system generates display data which is transmitted over a network to a client computer system having a display, and the client computer system processes the display data to present the graph to the user. In one example, the display data is an HTML format webpage or data therefore which is displayed on a browser running on the client computer system.

Various examples described herein demonstrate how a framework can be built to extract entities and relationships from a corpus of documents. The components utilized in an example implementation included a custom co-referencing strategy designed around a customer use case, and a custom model to classify relationships between pairs of entities. The model architecture was able to achieve results in line with state-of-the-art results despite the handicap of not including the relative position of entities. While including this information would undoubtedly boost performance on the academic datasets, some customer data lacks this information. It is demonstrated that the extracted information can be visualized and searched in an intuitive UI using tools such as Graphexp, an open source graph visualization and exploration UI.

In some examples, better co-referencing within a document could capture additional relationships from the documents and produce more dense knowledge graphs. Co-referencing across documents could link entities that are mentioned by aliases (such as Donald Trump, $45^{th}$ President of the UnitedStates, etc.). In some examples, an attention layer may be included on top of the model architecture. In some examples, this improves performance on the TACRED and SemEval8 datasets. Applying the model on distantly supervised datasets may provide a means to greatly extend the number of types in the TACRED or SemEval8 datasets to types more meaningful to some customers.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 8:
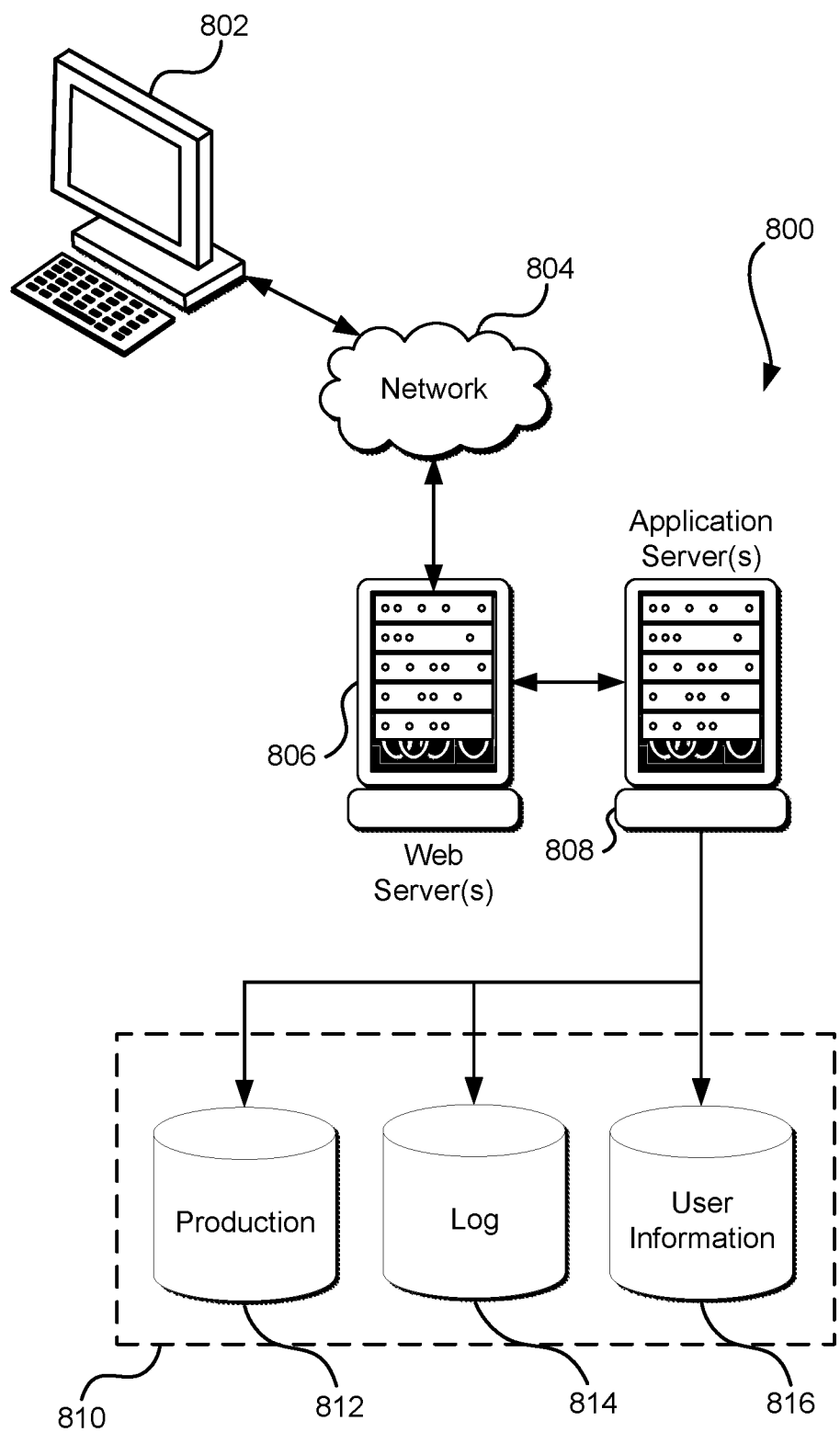
FIG. 8 illustrates a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 802 and the application server 808, in an embodiment, is handled by the web server using PUP: Hypertext Preprocessor ("PUP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto, and the application server 808 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
identify, using text extracted from a plurality of documents, a set of entities mentioned in the plurality of documents;
determine one or more relationships between a first entity and a second entity in the set of entities by at least tokenizing one or more individual sentences of individual documents of the plurality of documents, the one or more individual sentences mentioning both the first entity and the second entity;
determining that the first entity and a third entity are the same entity based at least in part on a score that represents similarity between a first set of relationships associated with the first entity and a second set of relationships associated with the third entity; and
as a result of determining that the first entity and the third entity are the same entity, updating information that represents relationships amongst the set of entities; and
generating display data that enables display of the information as a network that represents relationships between the set of entities.

2. The computer-implemented method of claim 1, wherein the information is displayed as a graph with individual nodes representing individual entities, and individual edges representing relationships between the individual entities.

3. The computer-implemented method of claim 1, wherein:
relationships between entities are identified by parsing a document in the set of documents into individual sentences; and
a relationship is identified as a result of an individual sentence of the individual sentences referring to two different entities.

4. The computer-implemented method of claim 1, wherein:
an individual entity of the set of entities has an entity type; and
the entity type is a location, person, place, organization, product, or event.

5. A system, comprising:
one or more processors;
memory that stores computer-executable instructions that, if executed, cause the one or more processors to:
identify one or more relationships between a first entity and a second entity in a set of entities mentioned in a set of documents, the one or more relationships identified based at least in part on a proximity, within one document of the set of documents, of a mention of the first entity to a mention of the second entity;
determining that the first entity and a third entity are related based at least in part on a score that represents similarity between a first set of relationships associated with the first entity and a second set of relationships associated with the third entity; and
as a result of determining that the first entity and the third entity are the related, generating display data enabling indication of a relationship on a display.

6. The system of claim 5, wherein each relationship of the one or more relationships has a relationship type that is determined based at least in part on presence of a word that links the first entity to the second entity within the one document.

7. The system of claim 6, wherein the relationship type identifies the relationship as an instance relationship, possession relationship, membership, an alias, or a co-location relationship.

8. The system of claim 5, wherein the first entity and the third entity are the same entity referred to by different names in the set of documents.

9. The system of claim 5, wherein the proximity is determined by measuring a number of words between a mention of the first entity and a mention of the second entity within a single document.

10. The system of claim 5, wherein the computer-executable instructions, as a result of being executed, cause the one or more processors to further:
present an interactive interface that displays relationships between entities; and
obtains, from the interactive interface, an indication of a change to the displayed relationships.

11. The system of claim 10, wherein the computer-executable instructions, if executed, cause the one or more processors to further indicate, via the interactive interface, a level of confidence that the first entity and the third entity may be the same entity by applying a texture to an edge of a graph edge between the first entity and the third entity, the texture based at least in part on the score.

12. The system of claim 10, wherein the computer-executable instructions, if executed, cause the one or more processors to further:
determine a similarity score for a first set of relationships associated with the first entity and a second set of relationships associated with the third entity; and
determine that the first entity and the third entity are the same entity as a result of the similarity score exceeding a threshold value.

13. A non-transitory computer-readable storage medium storing thereon executable instructions that, as a result of being executed by one or more processors of a computer system, cause the computer system to at least:
identify, from a set of documents, a first set of relationships between a first entity and a first set of entities, each relationship in the first set of relationships identified as a result of a recitation of the first entity being in proximity to a recitation of another entity in the first set of entities;
identify, from the set of documents, a second set of relationships between a second entity and a second set of entities, each relationship in the second set of relationships identified as a result of a recitation of the second entity being in proximity to a recitation of another entity in the second set of entities; and
record a relationship between the first entity and the second entity based on similarity of the first set of relationships to the second set of relationships.

14. The non-transitory computer-readable storage medium of claim 13, wherein the executable instructions further comprise instructions that, as a result of being executed by the one or more processors, cause the computer system to:
implement a neural network trained to generate a similarity score for a pair of entities; and
use the neural network to determine a similarity score for the first set of relationships and the second set of relationships, the similarity of the first set of relationships to the second set of relationships based at least in part on the similarity score.

15. The non-transitory computer-readable storage medium of claim 14, wherein the instructions further comprise instructions that, as a result of being executed by the one or more processors, cause the computer system to:

obtain relationship information related to the first entity and the second entity, the relationship information obtained via a graphical interface; and use the relationship information to update the neural network.

16. The non-transitory computer-readable storage medium of claim 13, wherein the instructions further include instructions that cause the computer system to determine, based at least in part on similarity of the first set of relationships to the second set of relationships, that the first entity and the second entity are the same entity.

17. The non-transitory computer-readable storage medium of claim 13, wherein:

the set of documents includes an image; and the instructions further include instructions that cause the computer system to apply optical character recognition to the image to extract textual information.

18. The non-transitory computer-readable storage medium of claim 13, wherein:

the first set of relationships are identified by identifying one or more entities mentioned in the same excerpt with the first entity; and the second set of relationships are identified by identifying one or more entities mentioned in the same excerpt with the second entity.

19. The non-transitory computer-readable storage medium of claim 13, wherein the computer system determines that the first entity and the second entity are different entities based at least in part on a lack of similarity between the first set of relationships and the second set of relationships.

20. The non-transitory computer-readable storage medium of claim 13, wherein the instructions further include instructions that cause the computer system to:

present, on a display screen, a subset of a graph that represents the first entity and the second entity as nodes of the graph, and the first set of relationships and the second set of relationships as edges that extend from the first entity and the second entity, the subset of the graph determined based at least in part on a node of the graph selected on the display; and obtain one or more modifications to the graph, the one or more modifications representing a change to the first set of relationships or the second set of relationships.

* * * * *